(12) United States Patent
Chen et al.

(10) Patent No.: US 10,921,193 B2
(45) Date of Patent: Feb. 16, 2021

(54) ELECTRONIC MEASUREMENT APPARATUS

(71) Applicant: Wistron Corp., New Taipei (TW)

(72) Inventors: Chih-Kang Chen, New Taipei (TW); Yu Tao Kao, New Taipei (TW); Shu Jing Lin, New Taipei (TW); Jiun Lin Wu, New Taipei (TW); Li-Xuan Sun, New Taipei (TW)

(73) Assignee: Wistron Corp., New Taipei (TW)

( * ) Notice: Subject to any disclaimer, the term of this patent is extended or adjusted under 35 U.S.C. 154(b) by 250 days.

(21) Appl. No.: 16/104,651

(22) Filed: Aug. 17, 2018

(65) Prior Publication Data
US 2019/0331533 A1 Oct. 31, 2019

(30) Foreign Application Priority Data

Apr. 25, 2018 (TW) .............................. 107114010 A

(51) Int. Cl.
*G01K 7/00* (2006.01)
*G01K 1/08* (2021.01)
*G01G 21/28* (2006.01)
*G01K 1/024* (2021.01)

(52) U.S. Cl.
CPC ............. *G01K 1/08* (2013.01); *G01G 21/283* (2013.01); *G01K 1/024* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,978,460 A * | 8/1976 | Jaquith | ................. | A01J 5/0133 119/14.17 |
| 7,256,357 B1 * | 8/2007 | Kesselman | .......... | G01G 19/005 177/25.15 |
| 8,388,222 B2 * | 3/2013 | Potter | ................. | A01M 1/2094 374/102 |
| 8,829,365 B1 * | 9/2014 | Wallace | ................. | G01G 19/00 177/25.13 |
| 2008/0245580 A1 * | 10/2008 | Aby-Eva | ............ | G01G 23/3728 177/238 |
| 2009/0205877 A1 * | 8/2009 | Claypool | ............... | G01G 21/22 177/239 |
| 2012/0122430 A1 * | 5/2012 | Hutchings | .......... | G01G 23/3742 455/414.1 |

(Continued)

FOREIGN PATENT DOCUMENTS

| | | |
|---|---|---|
| CN | 2735718 Y | 10/2005 |
| CN | 203038167 U | 7/2013 |

(Continued)

*Primary Examiner* — Lisa M Caputo
*Assistant Examiner* — Nasir U. Ahmed

(57) ABSTRACT

An electronic measurement apparatus includes a measurement device and a display device. The measurement device is configured to measure an object's weight and to generate a measurement signal. The display device is detachably assembled with the measurement device. Moreover, the display device can receive the measurement signal by wireless transmission, and the display device can display measurement data according to the measurement signal. Accordingly, the user can place the display device in an easy-to-view location to make it easier for the user to see the measurement data.

12 Claims, 15 Drawing Sheets

(56) References Cited

U.S. PATENT DOCUMENTS

2014/0063180 A1* 3/2014 Sharma .............. G01G 23/3735
 348/36
2015/0378399 A1* 12/2015 Grinstead ............. G06F 1/1632
 361/679.09
2016/0190736 A1* 6/2016 Chun ................. H01R 13/6205
 439/39

FOREIGN PATENT DOCUMENTS

| CN | 104713627 A | 6/2015 |
| CN | 205300735 U | 6/2016 |
| TW | M526127 U | 7/2016 |

* cited by examiner

ELECTRONIC MEASUREMENT APPARATUS

CROSS-REFERENCE TO RELATED APPLICATIONS

This Application claims priority of Taiwan Patent Application No. 107114010 filed on Apr. 25, 2018, the entirety of which is incorporated by reference herein.

BACKGROUND OF THE INVENTION

Field of the Invention

The present disclosure relates to a measurement apparatus, and in particular to an electronic measurement apparatus.

Description of the Related Art

A conventional electronic scale can be used to measure the weight of an object and include a display panel to display the weight of the object. However, such an electronic scale is usually placed on a tabletop, and its position may be lower than the user's waist. Therefore, the user needs to bow down or bend over to see the data on the display panel, which can make it inconvenient to use.

Moreover, on specific occasions, such as during coffee competitions, the user may place a container containing coffee on the electronic scale, and continuously add hot water to the container. The user not only needs to pay attention to the changing weight of the container, but also to other processes, so it is difficult to spend time bowing down or bending over to check the data on the display panel, resulting in mistakes in the game.

Although existing electronic scales have been generally adequate for their intended purposes, they have not been entirely satisfactory in all respects. Consequently, it would be desirable to provide a solution for improving the electronic scales.

BRIEF SUMMARY OF THE INVENTION

One embodiment of the present disclosure provides an electronic measurement apparatus, wherein the display device can be detachably assembled with the measurement device. Therefore, the user can separate the display device from the measurement device according to the requirements and place it in an easy-to-view location to provide the user with convenience.

One embodiment of the present disclosure provides an electronic measurement apparatus that includes a measurement device and a display device. The measurement device includes a first housing, a measurement module and a first wireless module. The measurement module is disposed on the first housing, and is configured to generate a measurement signal. The first wireless module is disposed in the first housing, and is configured to generate a wireless signal according to the measurement signal. The display device is detachably assembled with the measurement device, and includes a second housing, a second wireless module and a display panel. The second wireless module is disposed in the second housing, and configured to receive the wireless signal. The display panel is disposed on the second housing, and configured to display measurement data, which is corresponding to the measurement signal, according to the wireless signal.

In some embodiments, the measurement device further includes a first connection mechanism disposed on the first housing. The display device further includes a second connection mechanism disposed on the second housing, and corresponding to the first connection mechanism. The display device is detachably assembled with the measurement device by fastening the second connection mechanism with the first connection mechanism.

In some embodiments, the first connection mechanism includes a first magnetic element connected to the first housing. The second connection mechanism includes a second magnetic element connected to the second housing. When the display device is attached to the measurement device, the first magnetic element is adjacent to the second magnetic element, and a magnetic attraction force is generated between the first magnetic element and the second magnetic element.

In some embodiments, the first connection mechanism includes a first sliding track connected to the first housing. The second connection mechanism includes a second sliding track connected to the second housing. When the display device is attached to the measurement device, the first sliding track is assembled with the second sliding track, and the first sliding track limits the movement of the display device relative to the measurement device in a movement direction.

In some embodiments, the first connection mechanism includes a first locking element movably disposed on the first housing; and an elastic component disposed in the first housing and configured to apply an elastic force to the first locking element. The second housing further includes a locking groove. The second connection mechanism includes a second locking element connected to the second housing, and adjacent to the locking groove. When the display device is attached to the measurement device, the first locking element is inserted into the locking groove, and it is fastened to the second locking element.

In some embodiments, the first connection mechanism further includes a release button movably disposed on the first housing and connected to the first locking element. When the display device is attached to the measurement device, the first locking element is separated from the second locking element by pressing the release button.

In some embodiments, the first connection mechanism further includes first magnetic elements arranged on the first locking element. The second connection mechanism further includes second magnetic elements arranged on the second housing. When the display device is attached to the measurement device, and the first locking element is in an initial position, a magnetic attraction force is generated between the first magnetic elements generate and the second magnetic elements. When the display device is attached to the measurement device, and the first locking element is located in a separation position, a magnetic repulsion force is generated between the first magnetic elements generate and the second magnetic elements.

In some embodiments, the first connection mechanism includes a first locking element connected to the first housing. The second housing includes a locking groove. The second connection mechanism includes a second locking element connected to the second housing, and adjacent to the locking groove. When the display device is attached to the measurement device, the first locking element is inserted into the locking groove, and it is fastened to the second locking element.

In some embodiments, the first housing includes a positioning protrusion, and the second housing includes a positioning groove. When the display device is attached to the measurement device, the positioning protrusion is located in the positioning groove.

In some embodiments, the measurement device further includes a first electrical terminal movably disposed on the first housing. The display device further includes a second electrical terminal disposed on the second housing. When the display device is attached to the measurement device, the first electrical terminal is connected to the second electrical terminal.

In some embodiments, the measurement device further includes a first battery disposed in the first housing, and electrically connected to the first electrical terminal. The display device further includes a second battery disposed in the second housing, and electrically connected to second electrical terminal.

In some embodiments, the measurement device further includes a weight sensor configured to generate a weight signal, and the measurement signal includes the weight signal. In some embodiments, the measurement device further includes a temperature sensor configured to generate a temperature signal, and the measurement signal includes the temperature signal.

In conclusion, the measurement device of embodiments in the present disclosure can transmit the measurement result to the display device by wireless transmission, and the display device is detachably assembled with the measurement device. Therefore, the user can place the display device in an easy-to-view location to provide user convenience. Moreover, the display device can be simply assembled with the measurement device via the connection mechanism. The user can easily and quickly separate the display device from the measurement device, or assemble the display device with the measurement device.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
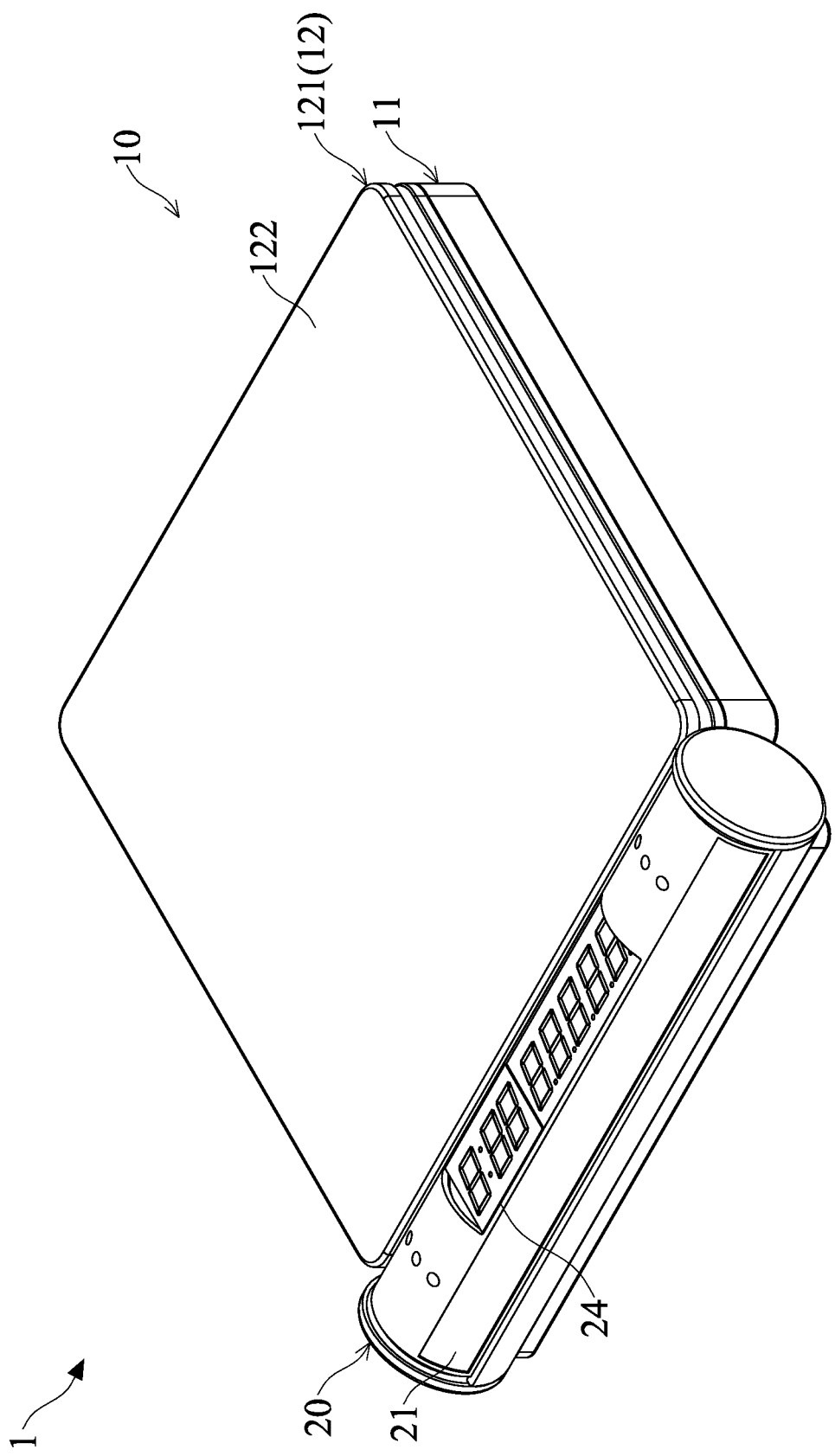
FIG. 1 is a perspective view of the electronic measurement apparatus, wherein the electronic measurement apparatus is in a combination state.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

The present disclosure may repeat reference numerals and/or letters in the various examples. This repetition is for the purpose of simplicity and clarity and does not in itself dictate a relationship between the various embodiments and/or configurations discussed. The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. Moreover, the shape, size, and thickness depicted in the drawings may not be drawn to scale or may be simplified for clarity of discussion; these drawings are merely intended for illustration.

Figure 2:
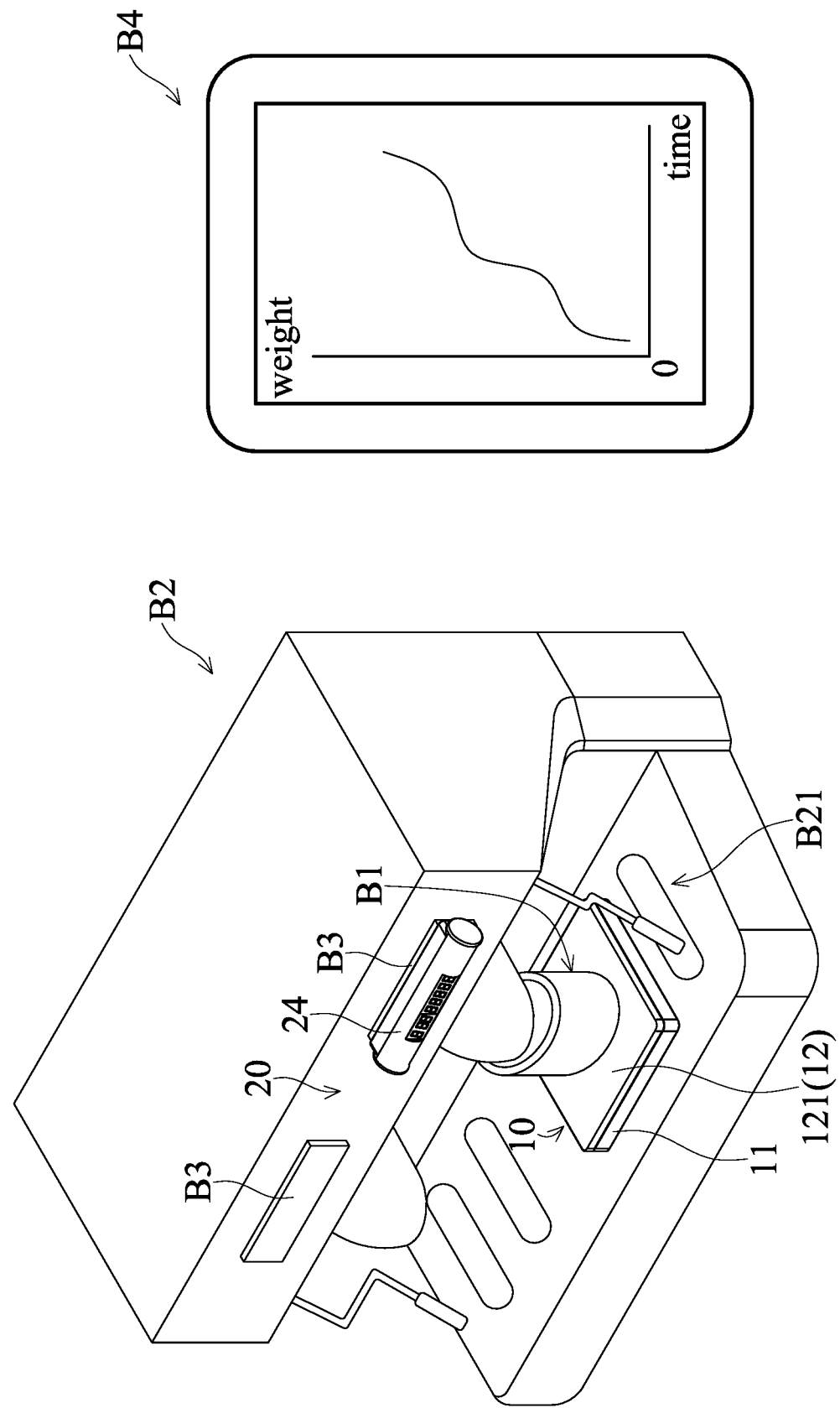
FIG. 2 is a perspective view of the electronic measurement apparatus for use in a coffee machine, wherein the electronic measurement apparatus is in a separation state.
Figure 3:
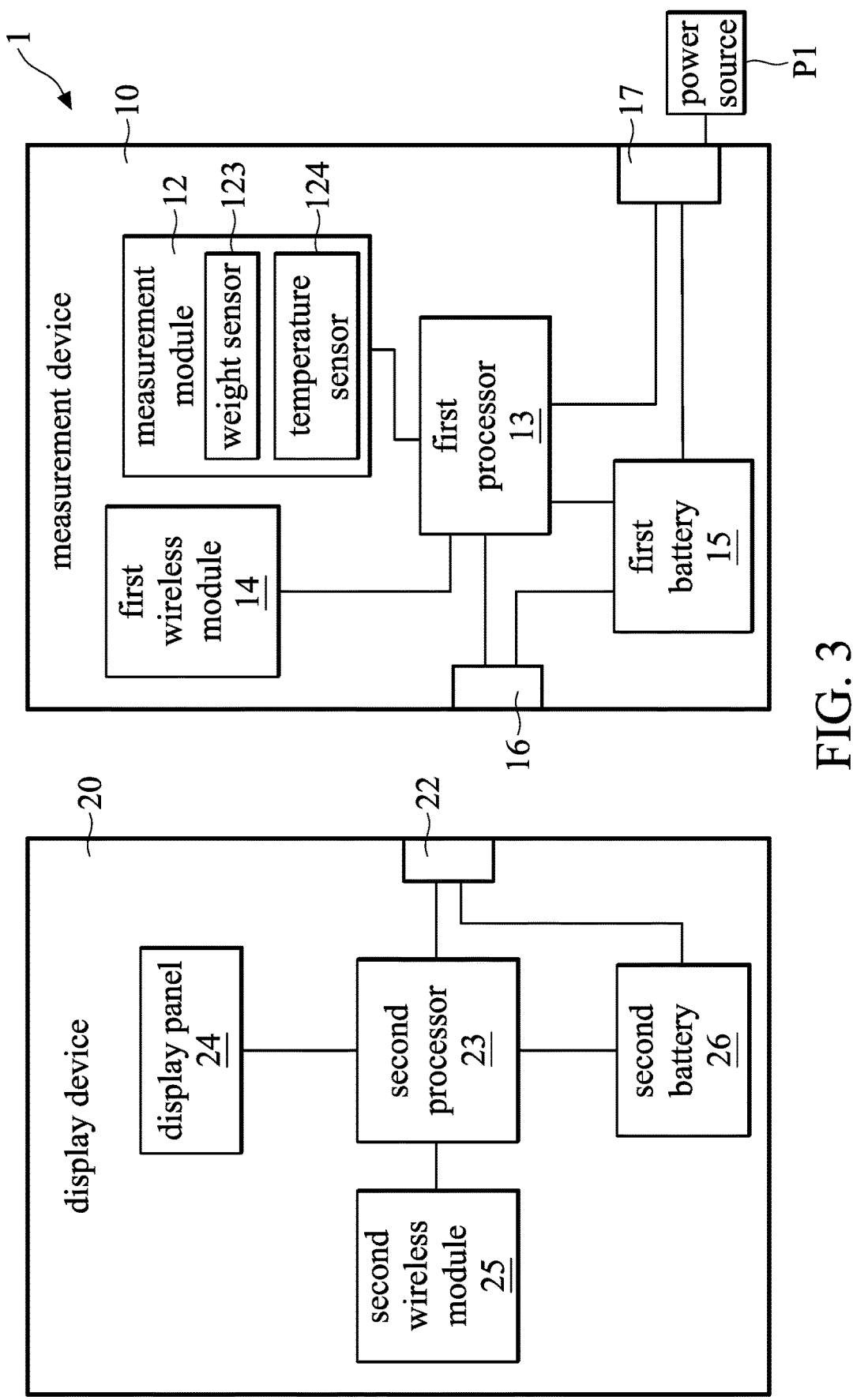
FIG. 3 is a system diagram of the electronic measurement apparatus.

FIG. 1 is a perspective view of the electronic measurement apparatus 1, wherein the electronic measurement apparatus 1 is in a combination state. FIG. 2 is a perspective view of the electronic measurement apparatus 1 for use in a work machine B2 and an electronic device B4, wherein the electronic measurement apparatus 1 is in a separation state. FIG. 3 is a system diagram of the electronic measurement apparatus 1. The electronic measurement apparatus 1 includes a measurement device 10 and a display device 20. The measurement device 10 can be used to place an object B1 (such as a container), and measure the weight or temperature of the object B1 placed on it. The display device 20 is detachably assembled with the measurement device 10, and configured to display the results detected by measurement device 10.

As shown in FIG. 2, the electronic measurement apparatus 1 can be disposed on a work machine B2, and the display device 20 can be removed and separated from the measurement device 10. In this embodiment, the display device 20 can be disposed on the top portion of the work machine B2 (such as a coffee machine), and thus it is convenient for users to watch the data displayed on the display panel 24.

The measurement device 10 may be disposed on a platform B21 of the work machine B2, and thus the height of the display device 20 can be higher than the height of the measurement device 10. The container B1 is disposed on the measurement device 10, and the work machine B2 can be used to continuously fill hot water in container B1. The measurement device 10 can continuously measure the change of the weight and/or temperature of the container B1, and continuously transmit the measurement result to the display device 20 in the manner of wireless transmission.

Since the position of the display device 20 is higher than the measurement device 10, the user can see the data on the display panel 24 of the display device 20 without excessively bowing or bending over, thereby improving the convenience of use.

In some embodiments, a mounting element B3 can be installed on the work machine B2. The display device 20 may be detachably disposed on the mounting element B3, and thus the display device 20 can be installed on the work machine B2 via the mounting element B3. In some embodiments, the display device 20 includes magnetic element, and is attached on the mounting element B3 by magnetic attraction force.

The measurement device 10 includes a first housing 11, a measurement module 12, a first processor 13, a first wireless module 14, a first battery 15, a first electrical connector 16, and a power connector 17. The first housing 11 may be a plate structure. The measurement module 12 is disposed on the first housing 11, and configured to generate measurement signals. The measurement signals include measurement data, such as time, weight and/or temperature, but it is not limited thereto.

The measurement module 12 includes a support base 121 and a weight sensor 123. The support base 121 is movably disposed on the first housing 11, and configured to support an object B1 (such as a container). In this embodiment, the object B1 may be disposed on a support surface 122 of the support base 121. The support surface 122 may be a main surface and a top surface of the measurement module 12. In some embodiments, when the measurement module 12 is disposed on a horizontal surface, the support surface 122 is parallel to the horizontal surface.

When the object B1 is put on the support base 121, or the weight of the object B1 put on the support base 121 is changed, the position of the support base 121 relative to the first housing 11 is changed. For example, the support base 121 is moved in a direction, which is perpendicular to the support surface 122. Moreover, the weight sensor 123 can detect the moving distance of the support base 121 relative to the first housing 11 to determine the weight of the object B1, and to generate a weight signal according to the weight of the object B1. In this case, the measurement signals have weight signals.

The measurement module 12 further includes a temperature sensor 124 disposed on the support base 121. The temperature sensor 124 is configured to detect the temperature of the object B1, and to generate a temperature signal according to the temperature of the object B1. In this case, the measurement signals have temperature signals. In some embodiments, the temperature sensor 124 is located between the support base 121 and the first housing 11. The temperature of the object B1 is indirectly obtained by the temperature of the support base 121.

The first processor 13 may be disposed in first housing 11, and electrically connected to the measurement module 12, the first wireless module 14, the first battery 15, the first electrical connector 16 and the power connector 17. The first processor 13 may be a central processing unit (CPU). The first processor 13 is configured to receive and process the measurement signals, and transmit the measurement signals to the first wireless module 14.

The first wireless module 14 is disposed in the first housing 11, and generates wireless signal according to the measurement signal. In this embodiment, the first wireless module 14 receives the measurement signals from the first processor 13, and emits wireless signals according to the measurement signals. In some embodiments, the first wireless module 14 may be a bluetooth transmission chip or another suitable wireless transmission chip.

As shown in FIGS. 2 and 3, one or more electronic device B4 is configured to receive the wireless signals emitted by the measurement device 10, and display measurement data according to the wireless signals. The electronic device B4 may be a smartphone, a tablet computer, a laptop computer, or a television, but it is not limited thereto.

The measurement data may include measurement time, weight and/or temperature, for example. The measurement time correspond to the time of measuring the weight and/or the temperature. In some embodiments, a data chart, such as a time-to-weight chart or a time-to-temperature chart, can be formed according to the measurement data. Therefore, the user can observe and analyze the change of weight or temperature of the object B1 according to the data chart.

The first battery 15 may be disposed in the first housing 11, and may be electrically connected to the first processor 13, the first electrical connector 16, and the power connector 17. The first battery 15 may be a rechargeable battery. In some embodiments, the first battery 15 may be a lithium battery. The first battery 15 is configured to apply power to the first processor 13. The power connector 17 is configured to connect a power source P1. The power transmitted by the power source P1 may be used to charge the first battery 15, or applied to the first processor 13.

The display device 20 is detachably assembled with the measurement device 10. The display device 20 may be a plate structure, but it is not limited thereto. In some embodiments, the volume of the display device 20 is less than half the volume of the measurement device 10.

The display device 20 includes a second housing 21, a second electrical connector 22, a second processor 23, a display panel 24, a second wireless module 25, and a second battery 26. As shown in FIGS. 1 and 3, when the electronic measurement apparatus 1 is in a combination state, the display device 20 is assembled with the measurement device 10. The first housing 11 of the display device 20 is connected to the second housing 21, and the second electrical connector 22 is connected to the first electrical connector 16.

The second processor 23 is disposed in the second housing 21, and is electrically connected to display panel 24, the second wireless module 25 and the second battery 26. The second processor 23 may be a central processing unit (CPU). When the display device 20 is attached to the measurement device 10, the second processor 23 receives the measurement signals via first electrical connector 16 and the second electrical connector 22. Moreover, the second processor 23 can process the measurement signals, and transmit the measurement signals to the display panel 24. When the display device 20 is separated from the measurement device 10, the second processor 23 receives and process the wireless signals transmitted from the second wireless module 25.

The display panel 24 is disposed on the second housing 21, and configured to display measurement data corresponding to the measurement signals. When the display device 20 is attached to the measurement device 10, the display panel 24 displays the measurement data according to the measurement signals transmitted from the second processor 23. When the display device 20 is separated from the measurement device 10, the second processor 23 generates measurement signals according to the wireless signals transmitted from the second wireless module 25, and the display panel 24 displays measurement data according to the measurement signals. In other words, the display panel 24 is configured to display measurement data, which is corresponding to the measurement signal, according to the wireless signals.

The measurement data may include data, such as time, weight and/or temperature. In some embodiments, a data chart may be formed by the measurement data, such as such as a time-to-weight chart or a time-to-temperature chart. Therefore, the user can observe and analyze the change of weight or temperature of object B1 according to the data chart.

The second wireless module 25 may be disposed in the second housing 21, and configured to receive the wireless signals emitted by the first wireless module 14, and transmit the wireless signals to the second processor 23. In some embodiments, the second wireless module 25 is a bluetooth transmission chip.

The second battery 26 may be disposed in the second housing 21, and electrically connected to second processor 23 and the second electrical connector 22. The second battery 26 may be a rechargeable battery. In some embodiments, second battery 26 may be a lithium battery. The second battery 26 is configured to apply power to the second processor 23. When the display device 20 is attached to the measurement device 10, the first battery 15 provides the second battery 26, the second processor 23 and/or the display panel 24 via the first electrical connector 16 and the second electrical connector 22. In some embodiments, the second electrical connector 22 is connected to the power source P1, and the power source P1 may be used to charge the second battery 26 via the second electrical connector 22.

Figure 4:
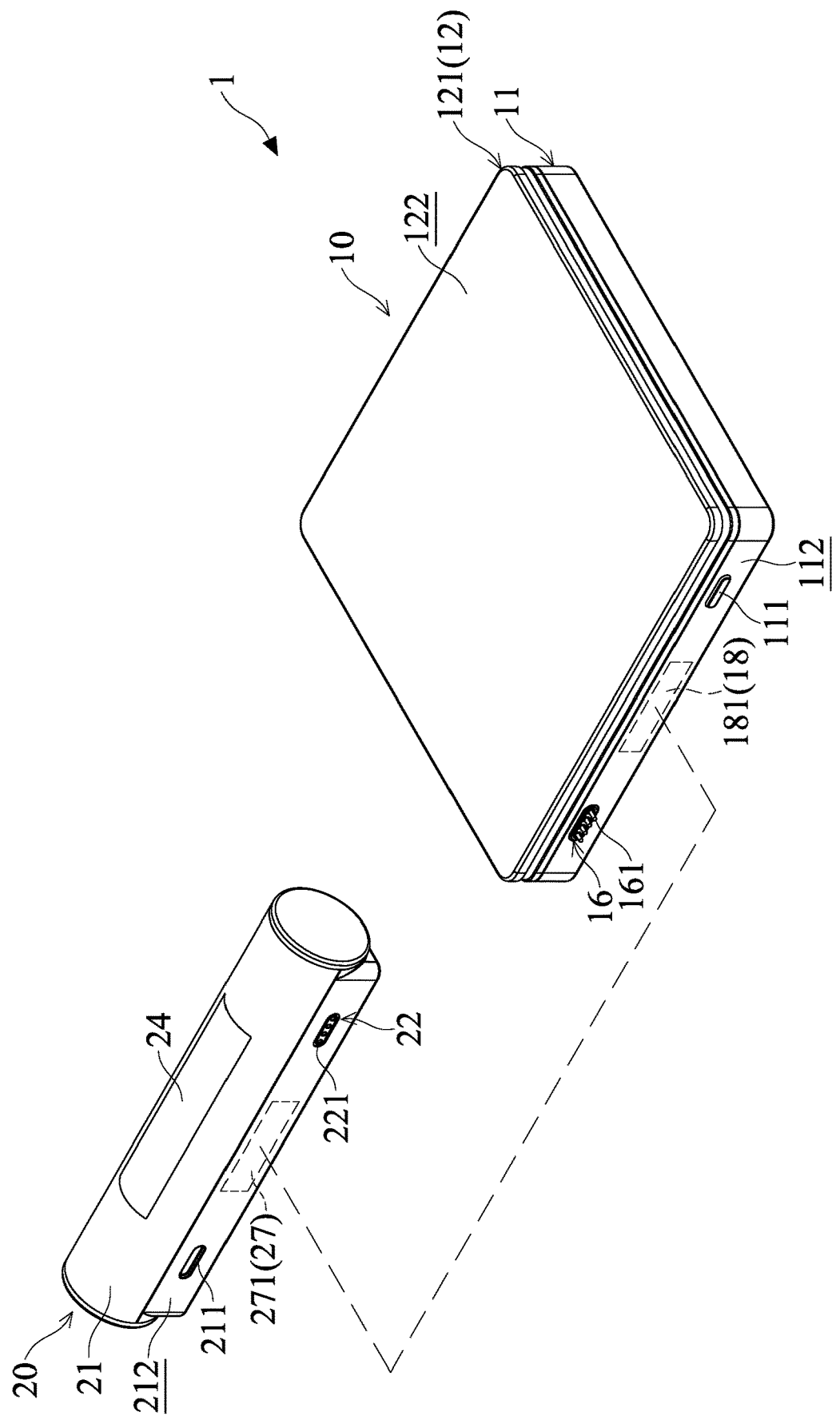
FIG. 4 is a perspective view of the electronic measurement apparatus in accordance with a first embodiment of the disclosure, wherein the electronic measurement apparatus is in a separation state.
Figure 5:
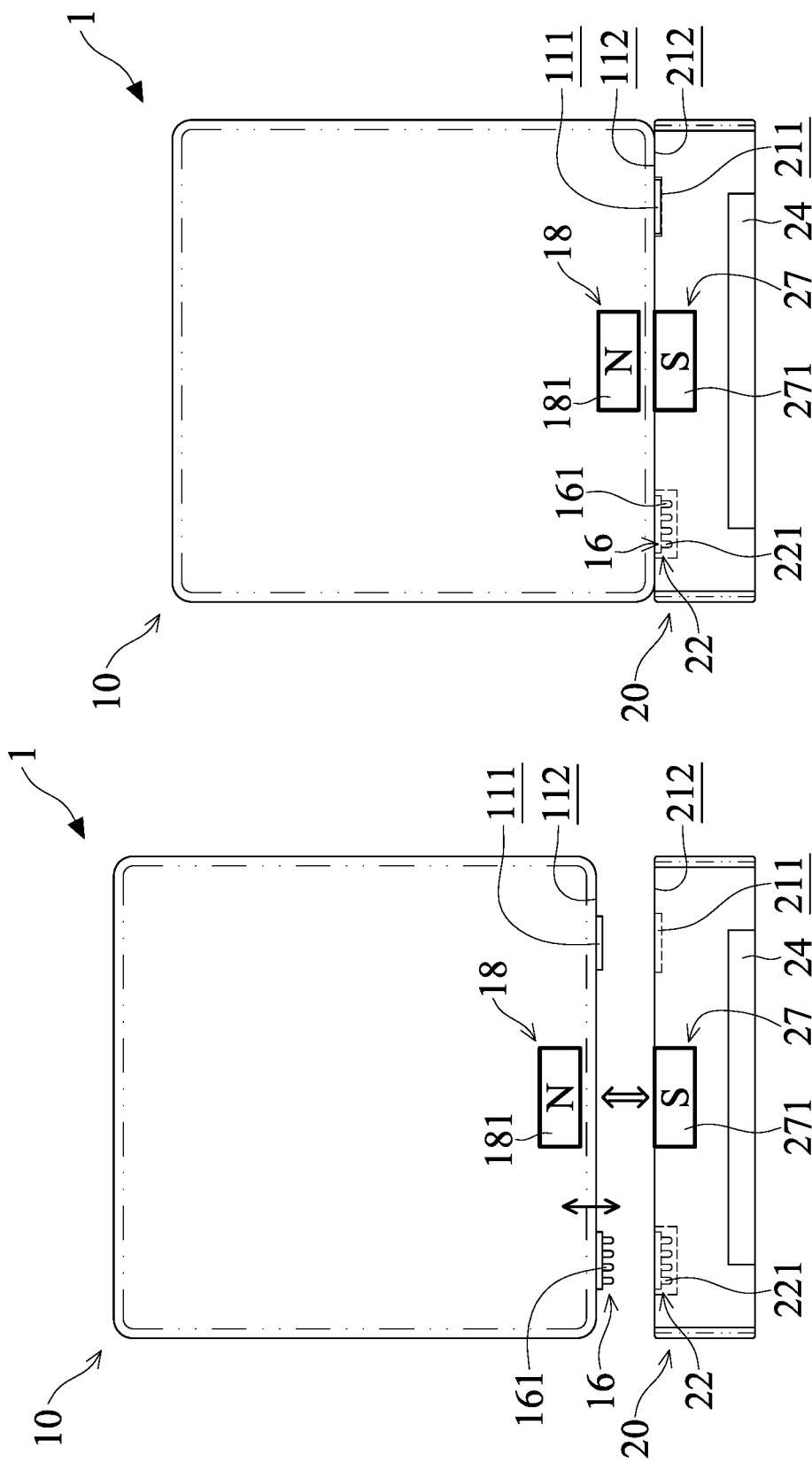
FIG. 5A is a schematic view of the electronic measurement apparatus in accordance with the first embodiment of the disclosure, wherein the electronic measurement apparatus is in the separation state.
FIG. 5B is a schematic view of the electronic measurement apparatus in accordance with the first embodiment of the disclosure, wherein the electronic measurement apparatus is in a combination state.

FIG. 4 is a perspective view of the electronic measurement apparatus 1 in accordance with the first embodiment of the disclosure, wherein the electronic measurement apparatus 1 is in a separation state. FIGS. 5A and 5B are schematic views of the electronic measurement apparatus 1 in accordance with the first embodiment of the disclosure. In FIG. 5A, the electronic measurement apparatus 1 is in a separation state, and in FIG. 5B, the electronic measurement apparatus 1 is in a combination state.

The first housing 11 further includes a positioning protrusion 111 disposed on the front surface 112 of the first housing 11. The second housing 21 further includes a positioning groove 211 formed on a rear surface 212 of the second housing 21. Moreover, the first electrical connector 16 is located on the front surface 112 of the first housing 11, and the second electrical connector 22 is located on the rear surface 212 of the second housing 21. When the display device 20 is attached to the measurement device 10, the positioning protrusion 111 is located in the positioning groove 211, and the front surface 112 is connected to the rear surface 212. Moreover, the first electrical connector 16 is connected to the second electrical connector 22.

When the display device 20 is attached to the measurement device 10, the position of the display device 20 relative to the measurement device 10 can be limited by the positioning protrusion 111 and the positioning groove 211. Moreover, when the display device 20 is attached to the measurement device 10, the first electrical connector 16 may be accurately aligned with the second electrical connector 22 by the positioning protrusion 111 and the positioning groove 211.

In some embodiments, the first electrical connector 16 includes first electrical terminals 161. The first electrical terminals 161 are movably disposed on the first housing 11. The first electrical terminals 161 can be extended to the front surface 112 of the first housing 11 by the elastic force, and can be retracted into the first housing 11 via a pressure. The display device 20 further includes second electrical terminals 221 disposed on the rear surface 212 of the second housing 21.

When the display device 20 is attached to the measurement device 10, the first electrical terminal 161 is inserted into the second electrical terminal 221. When the display device 20 is attached to the measurement device 10 in an improper position, and the second housing 21 of the display device 20 collides with the first electrical terminal 161, the first electrical terminal 161 can be retracted into the first housing 11 to prevent the first electrical terminal 161 from damage.

The measurement device 10 further includes a first connection mechanism 18 disposed on the first housing 11. The display device 20 further includes a second connection mechanism 27 disposed on the second housing 21, and corresponding to the first connection mechanism 18. The display device 20 is detachably assembled with the measurement device 10 by fastening the second connection mechanism 27 with the first connection mechanism 18.

In this embodiment, the first connection mechanism 18 includes a first magnetic element 181 connected to the first housing 11 and adjacent to the front surface 112. The second connection mechanism 27 includes a second magnetic element 271 connected to the second housing 21 and adjacent to the rear surface 212. In this embodiment, the first magnetic element 181 is disposed in the first housing 11, and the second magnetic element 271 may be disposed in the second housing 21, and thus the appearance of the measurement device 10 and the display device 20 can be improved.

The first magnetic element 181 and/or the second magnetic element 271 may be a permanent magnet. In some embodiments, the first magnetic element 181 may be a permanent magnet, and the second magnetic element 271 may be ferromagnetic materials, such as iron. In some embodiments, the second magnetic element 271 may be a permanent magnet, and the first magnetic element 181 may be ferromagnetic materials.

When the display device 20 is attached to the measurement device 10, the first magnetic element 181 is adjacent to the second magnetic element 271, and a magnetic attraction force is generated between the first magnetic element 181 and the second magnetic element 271, and thus the display device 20 can be detachably assembled with the measurement device 10.

Figure 6:
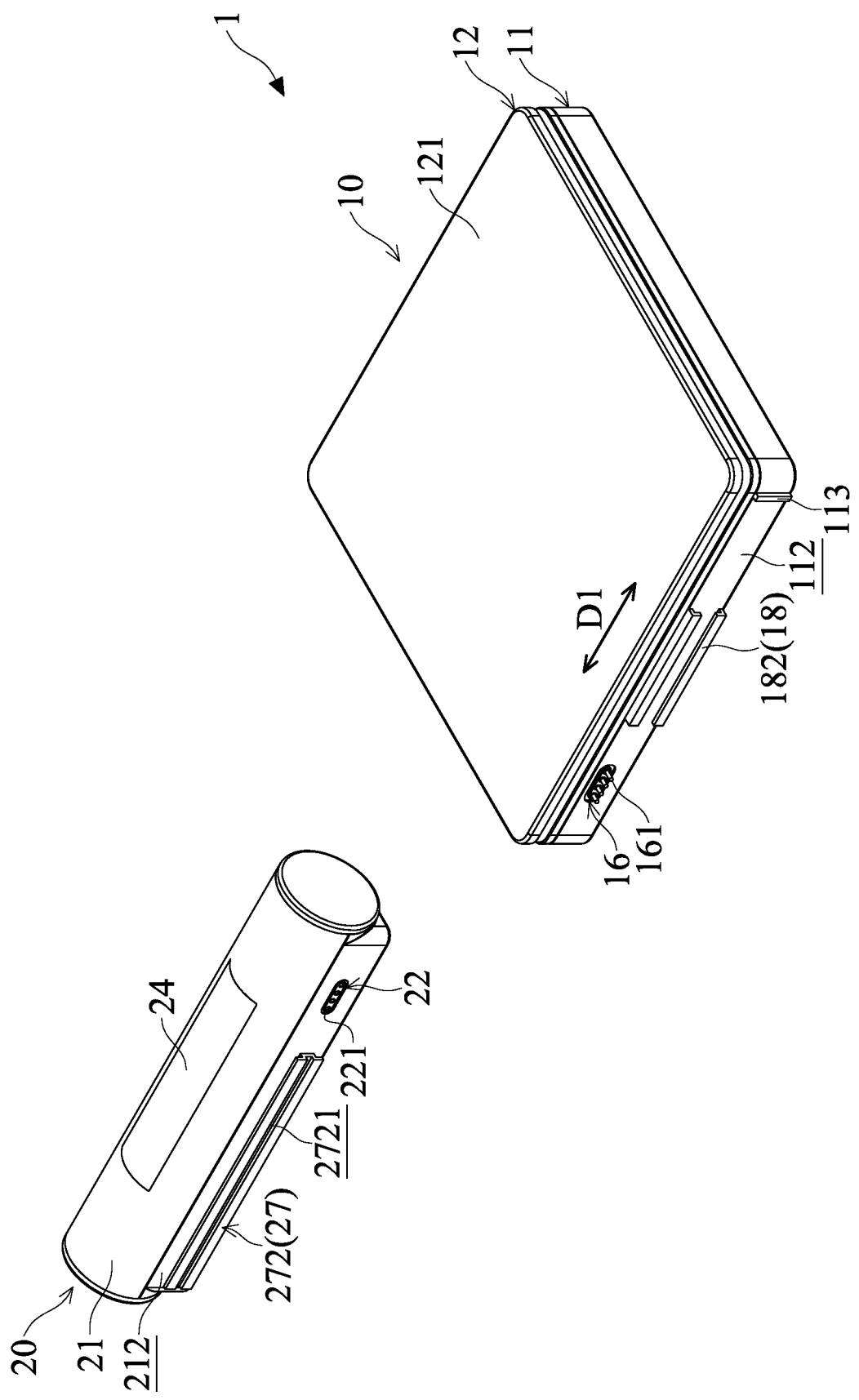
FIG. 6 is a perspective view of the electronic measurement apparatus in accordance with a second embodiment of the disclosure, wherein the electronic measurement apparatus 1 is in a separation state.

FIG. 6 is a perspective view of the electronic measurement apparatus 1 in accordance with the second embodiment of the disclosure, wherein the electronic measurement apparatus 1 is in a separation state. In this embodiment, the first connection mechanism 18 includes a first sliding track 182 connected to the front surface 112 of the first housing 11. The second connection mechanism 27 includes a second sliding track 272 connected to the rear surface 212 of the second housing 21. When the display device 20 is attached to the measurement device 10, the first sliding track 182 is assembled with the second sliding track 272 and limits the movement of the display device 20 relative to the measurement device 10 in the movement direction D1.

In this embodiment, the first sliding track 182 and the second sliding track 272 extend in the movement direction D1. The second sliding track 272 further includes a terminal groove 2721 extending along the movement direction D1. When the second sliding track 272 is assembled with first sliding track 182, the first electrical terminal 161 is located in the terminal groove 2721, and thus the second sliding track 272 can move smoothly relative to the first sliding track 182 in the movement direction D1.

In this embodiment, the first housing 11 further includes a block protrusion 113 disposed on the front surface 112 of the first housing 11. When the display device 20 is moved relative to the measurement device 10 in the movement direction D1, the block protrusion 113 can be used to block the second sliding track 272, and to prompt the user that the display device 20 has moved to a correct position.

Figure 7A:
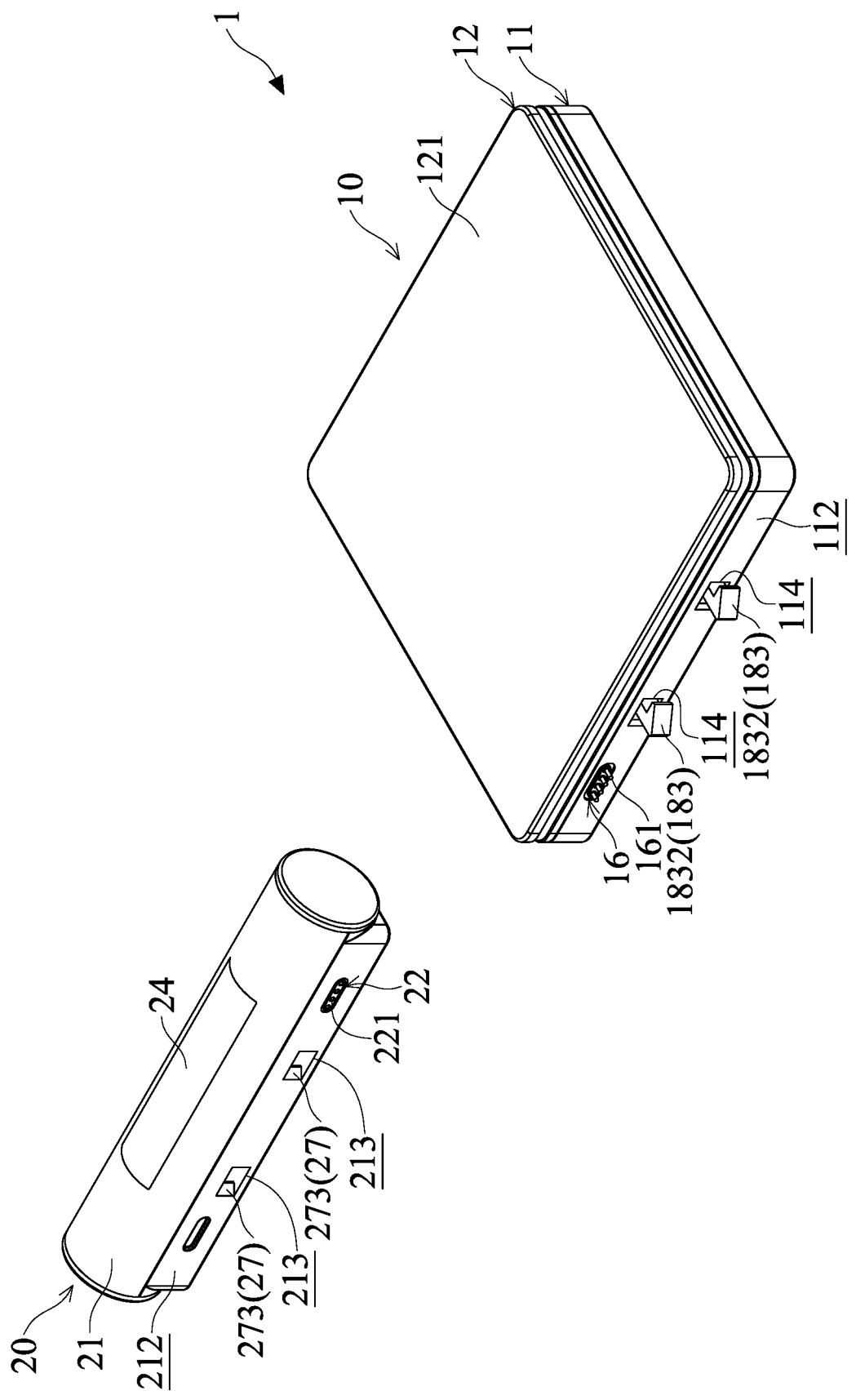
FIG. 7A is a perspective view of the electronic measurement apparatus in accordance with a third embodiment of the disclosure, wherein the electronic measurement apparatus is in a separation state.
Figure 7B:
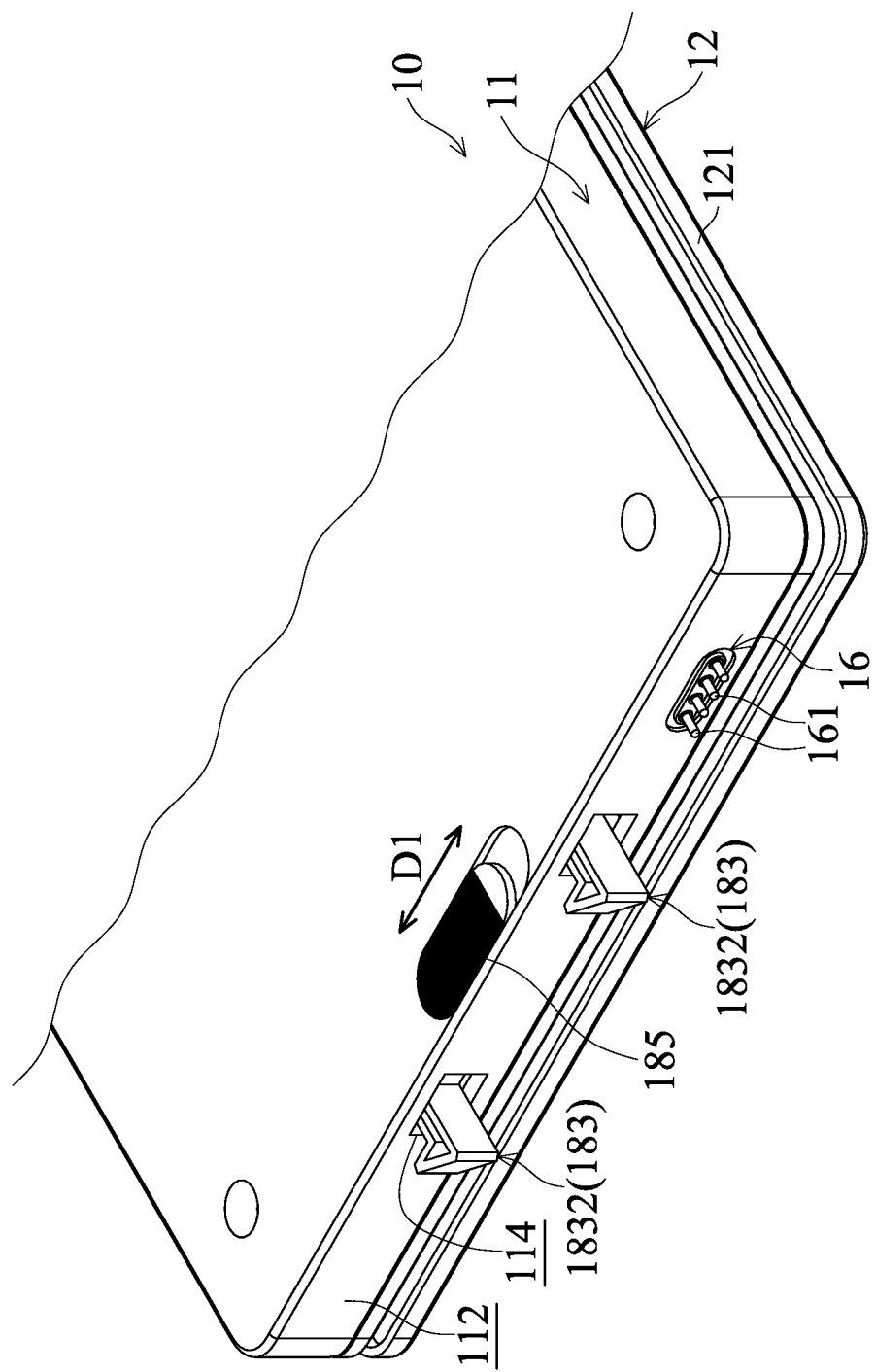
FIG. 7B is a perspective view of the measurement device in accordance with the third embodiment of the disclosure.
Figure 8A:
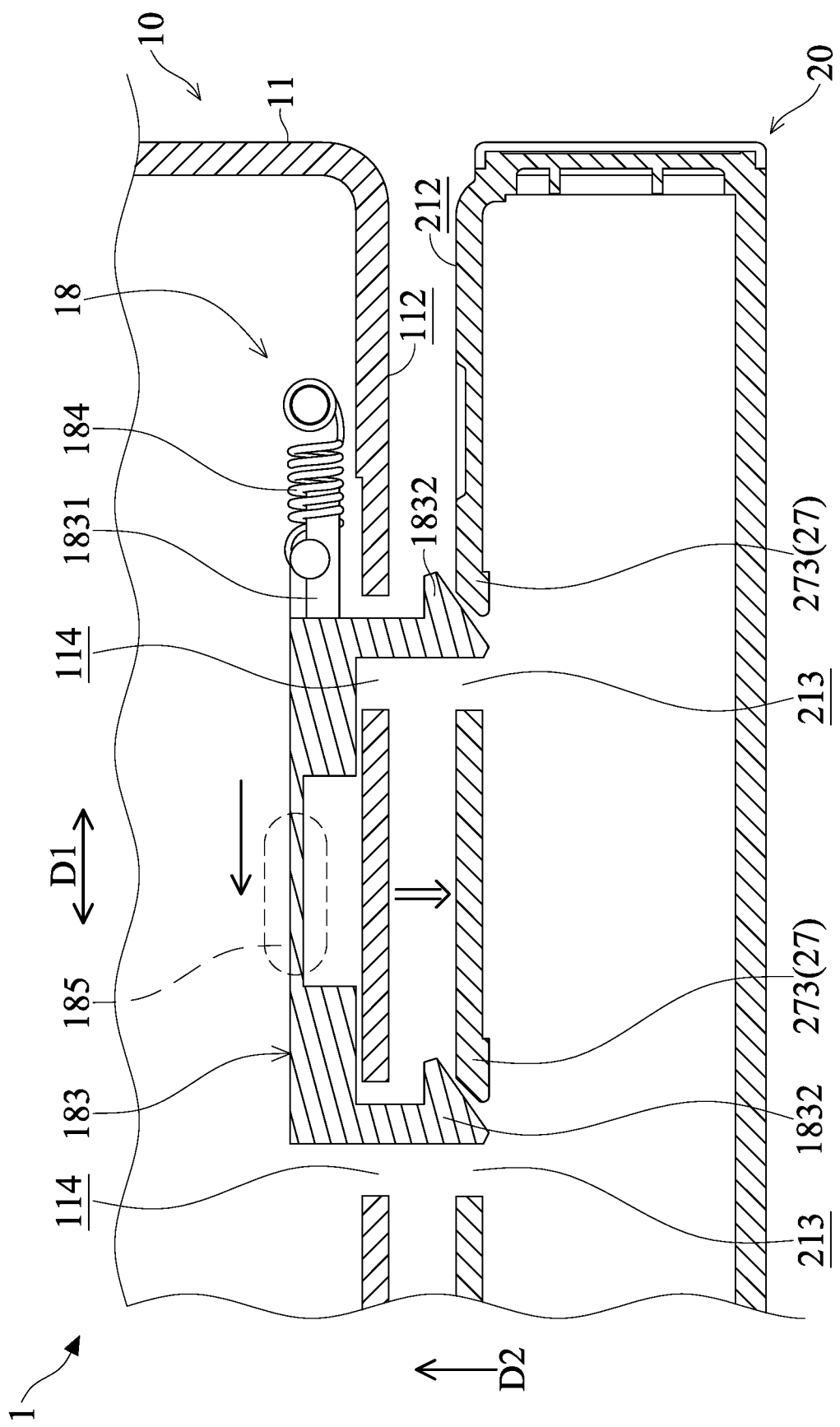
FIG. 8A is a schematic view of the electronic measurement apparatus 1 in accordance with the third embodiment of the disclosure, wherein the electronic measurement apparatus is in the separation state.
Figure 8B:
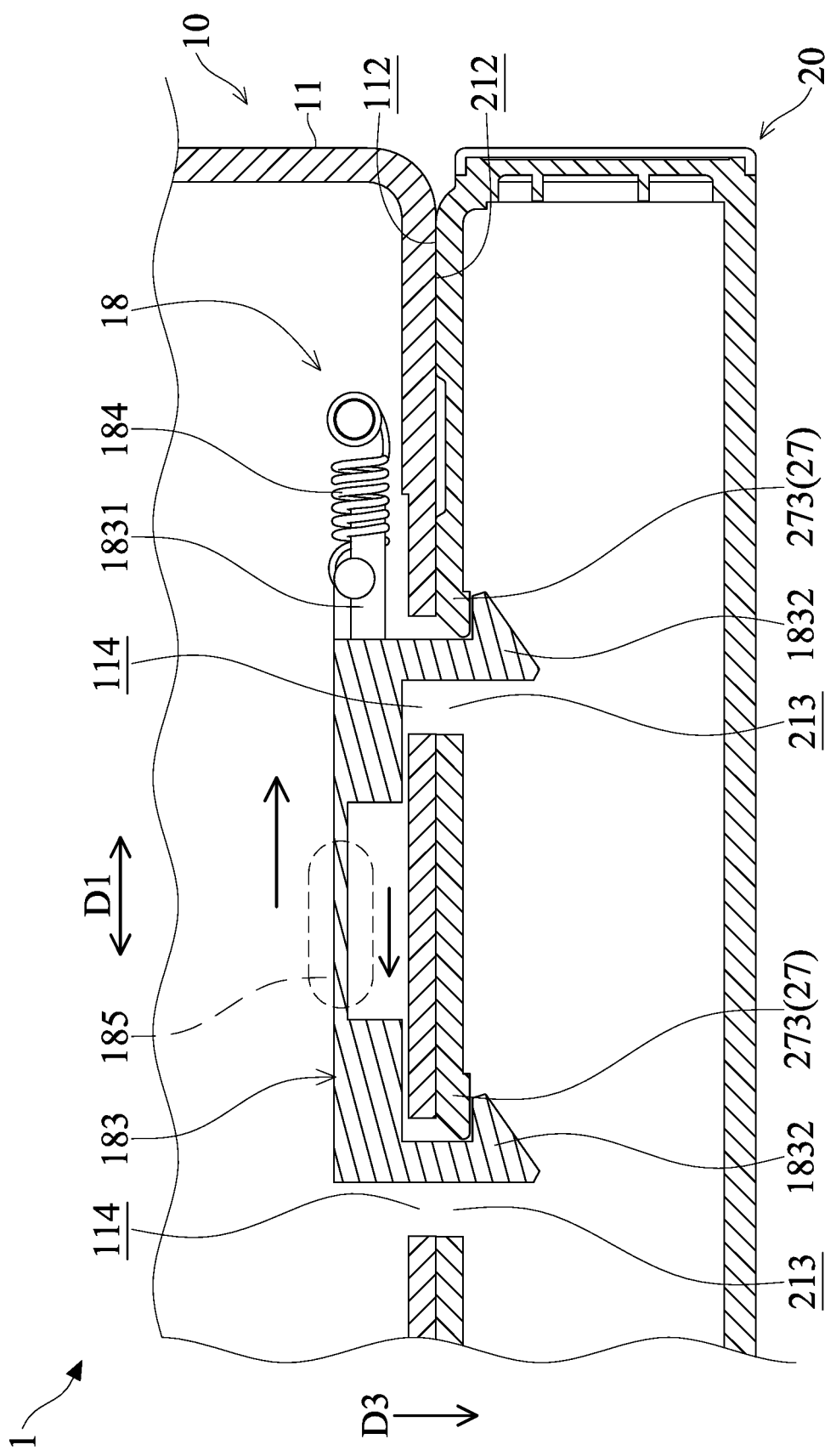
FIG. 8B is a schematic view of the electronic measurement apparatus in accordance with the third embodiment of the disclosure, wherein the electronic measurement apparatus is in a combination state.

FIG. 7A is a perspective view of the electronic measurement apparatus 1 in accordance with the third embodiment of the disclosure, wherein the electronic measurement apparatus 1 is in a separation state. FIG. 7B is a perspective view of the measurement device 10 in accordance with the third embodiment of the disclosure. FIGS. 8A and 8B are schematic views of the electronic measurement apparatus 1 in accordance with the third embodiment of the disclosure, wherein in FIG. 8A, the electronic measurement apparatus 1 is in a separation state, and in FIG. 8B, the electronic measurement apparatus 1 is in a combination state.

The first connection mechanism 18 includes a first locking element 183 and an elastic component 184. The first locking element 183 is movably disposed on the first housing 11. In this embodiment, the first housing 11 can limit the movement of the first locking element 183 in the movement direction D1. The first locking element 183 may include a connection rod 1831 and locking portions 1832. The connection rod 1831 may extend in the movement direction D1. The locking portion 1832 is disposed on the connection rod 1831, and passes through the opening 114 of the first housing 11. The opening 114 may be formed on the front surface 112. In other words, the locking portion 1832 passes through the front surface 112, and exposed from the first housing 11.

The elastic component 184 is connected to the connection rod 1831 and the first housing 11. The elastic component 184 is configured to provide an elastic force to the first locking element 183, so as to keep the first locking element 183 in an initial position. In other words, the elastic component 184 applies an elastic force to the first locking element 183 in the movement direction D1. When the first locking element 183 is moved to the separation position, the elastic component 184 moves the first locking element 183 to the initial position in the movement direction D1.

The second connection mechanism 27 includes second locking elements 273 connected to the second housing 21 and adjacent to the locking groove 213 of the second housing 21. In this embodiment, the second locking element 273 and the second housing 21 are formed as a single piece, and the second locking element 273 may be connected to the locking groove 213 or located in the locking groove 213.

As shown in FIG. 8A, during assembly of the display device 20 with the measurement device 10, the display device 20 is moved toward the measurement device 10 in an installation direction D2. When the locking portion 1832 abuts the second locking element 273, the second locking element 273 pushes the locking portion 1832, so as to move the first locking element 183 from the initial position in the movement direction D1. As shown in FIG. 8B, when the display device 20 is attached to the measurement device 10, the locking portion 1832 is inserted into the locking groove 213, and the elastic component 184 moves the first locking element 183 to the initial position, so as to make the locking portion 1832 fasten to the second locking element 273.

As shown in FIGS. 7B, 8A and 8B, the first connection mechanism 18 further includes a release button 185 movably disposed on the first housing 11, and connected to the first locking element 183. As shown in FIG. 8B, when separating the display device 20 from the measurement device 10, first, the release button 185 is moved from the initial position in the movement direction D1, so as to move the first locking element 183 in the same direction, and separate the locking portion 1832 from the second locking element 273. Afterwards, the display device 20 can be moved in the separation direction D3, so as to separate the locking portion 1832 from the locking groove 213. As shown in FIG. 8A, when the display device 20 is separated from the measurement device 10, the release button 185 can be released, and the elastic component 184 moves the release button 185 and the first locking element 183 return to the initial position.

Figure 9A:
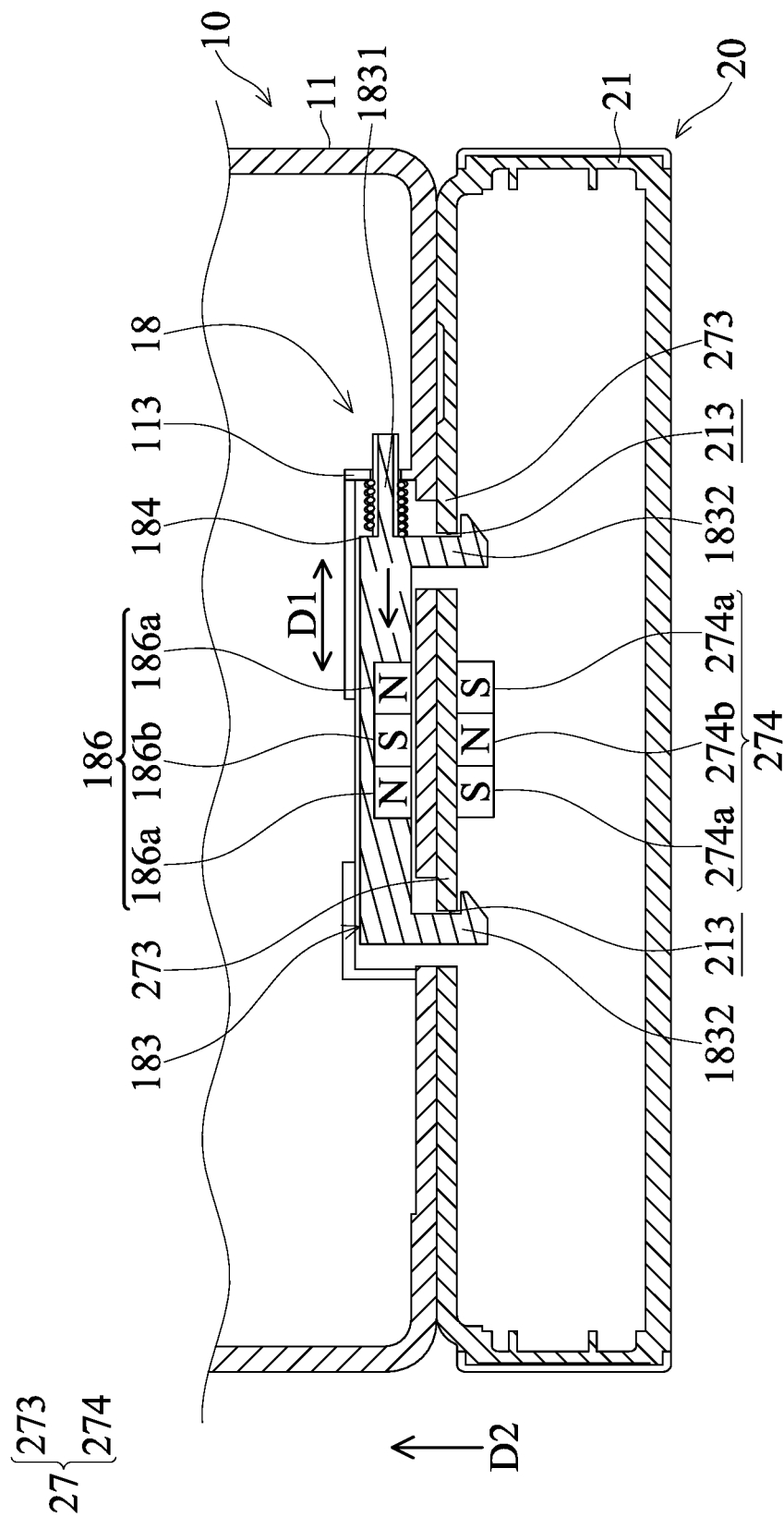
FIG. 9A is a schematic view of the electronic measurement apparatus in accordance with a fourth embodiment of the disclosure, wherein the electronic measurement apparatus is in a combination state, and the first locking element is in an initial position.
Figure 9B:
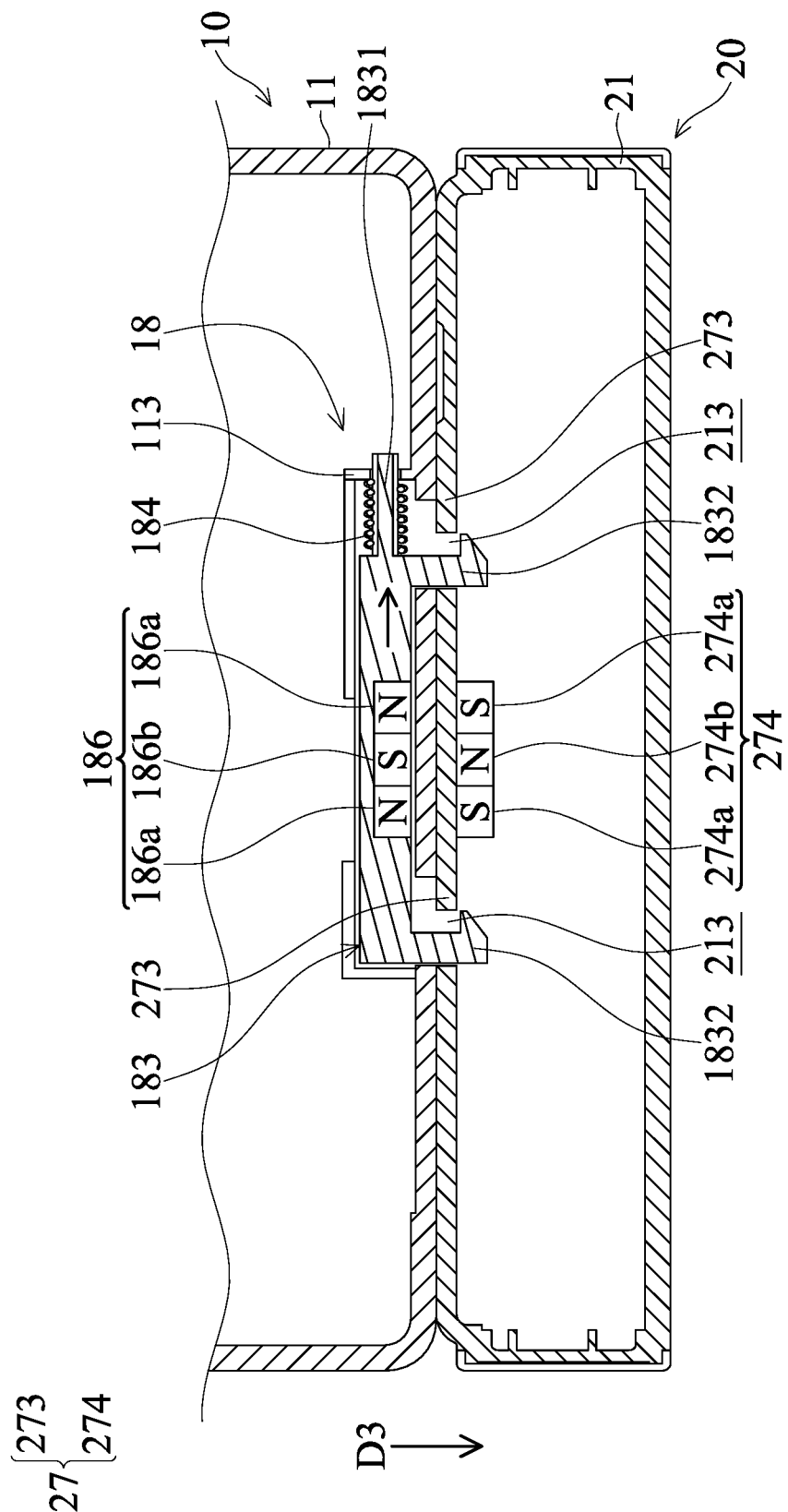
FIG. 9B is a schematic view of the electronic measurement apparatus in accordance with the fourth embodiment of the disclosure, wherein the first locking element is in a separation position.
Figure 10:
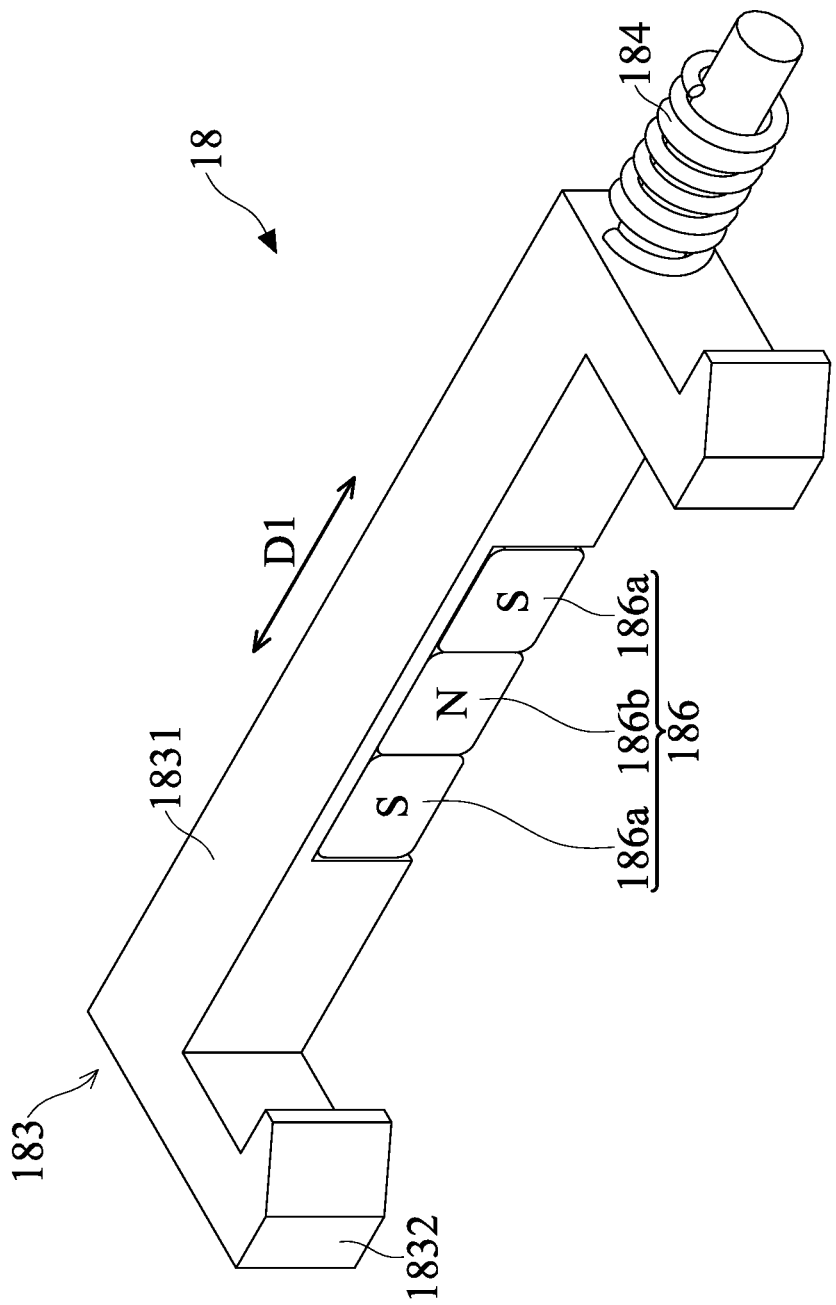
FIG. 10 is a perspective view of the first connection mechanism in accordance with the fourth embodiment of the disclosure.

FIGS. 9A and 9B are schematic views of the electronic measurement apparatus 1 in accordance with the fourth embodiment of the disclosure, wherein in FIG. 9A, the electronic measurement apparatus 1 is in a combination state, and the first locking element 183 is in an initial position. In FIG. 9B, the first locking element 183 is in a separation position. FIG. 10 is a perspective view of the first connection mechanism 18 in accordance with the fourth embodiment of the disclosure.

The first connection mechanism 18 includes a first locking element 183, an elastic component 184, and first magnetic elements 186. The first locking element 183 is movably disposed on the first housing 11. In this embodiment, the first housing 11 can limit the movement of the first locking element 183 in the movement direction D1. The first locking element 183 includes a connection rod 1831 and locking portions 1832. The connection rod 1831 extends in the movement direction D1. The locking portion 1832 is disposed on the connection rod 1831, and passes through the opening 114 of the first housing 11. The opening 114 may be formed on the front surface 112. In other words, the locking portion 1832 passes through the front surface 112, and exposed from the first housing 11.

The elastic component 184 is connected to the connection rod 1831 and the first housing 11. The elastic component 184 is configured to provide an elastic force to the first locking element 183, so as to keep the first locking element 183 in an initial position. In other words, the elastic component 184 applies the elastic force of the first locking element 183 in the movement direction D1. When the first locking element 183 is moved to a separation position, the elastic component 184 moves the first locking element 183 to the initial position in the movement direction D1. In this embodiment, the first housing 11 may include a block protrusion 113. One end of the connection rod 1831 may passes through the block protrusion 113, and the other end of the elastic component 184 abuts on the block protrusion 113.

The first magnetic elements 186 are arranged on the connection rod 1831 in the movement direction D1. The first magnetic elements 186 may be permanent magnets. In this embodiment, the first connection mechanism 18 includes two first magnetic elements 186a and one first magnetic element 186b. However, the number of the first magnetic elements 186a and the first magnetic element 186b are not limited. In some embodiments, there are at least three first magnetic elements 186a, and at least two first magnetic elements 186b.

The magnetic direction of the first magnetic elements 186a may be opposite to the magnetic direction of the first magnetic element 186b. The first magnetic elements 186a and the first magnetic element 186b may be alternately arranged in the movement direction D1.

The second connection mechanism 27 further includes second magnetic elements 274 arranged on the second housing 21 in the movement direction D1. The second magnetic elements 274 may be permanent magnets. In this embodiment, the second connection mechanism 27 includes two second magnetic elements 274a and one second magnetic element 274b. However, the number of the second magnetic elements 274a and the second magnetic element 274b are not limited. In some embodiments, there are at least three second magnetic elements 274a, and at least two second magnetic elements 274b.

The magnetic direction of the second magnetic elements 274a may be opposite to the magnetic direction of the second magnetic element 274b. The second magnetic elements 274a and the second magnetic element 274b may be alternately arranged in the movement direction D1.

As shown in FIG. 9A, when the electronic measurement apparatus 1 is in a combination state, and the first locking element 183 is in an initial position, the first magnetic elements 186a correspond to the second magnetic elements 274a. The first magnetic poles of the first magnetic elements 186a face the second magnetic poles of the second magnetic elements 274a. Therefore, a magnetic attraction force is generated between the first magnetic elements 186a and the second magnetic elements 274a. In some embodiments, the first magnetic pole is N pole, and the second magnetic pole S pole. In some embodiments, the first magnetic pole is S pole, and the second magnetic pole is N pole.

Moreover, the first magnetic element 186b corresponds to the second magnetic element 274b, and the second magnetic pole of the first magnetic element 186b faces the first magnetic pole of the second magnetic element 274b, and thus a magnetic attraction force is generated between the first magnetic element 186b and the second magnetic element 274b. Accordingly, the display device 20 can be assembled with the measurement device 10 by the magnetic attraction force between the first magnetic elements 186 and the second magnetic elements 274, and by the combination of the first locking element 183 and the second locking element 273.

As shown in FIG. 9B, when the first locking element 183 is moved into a separation position, the first magnetic elements 186a correspond to the second magnetic element 274b, and the first magnetic pole of the first magnetic elements 186a faces the first magnetic pole of the second magnetic element 274b, and thus a magnetic repulsion force is generated between the first magnetic elements 186a and the second magnetic element 274b. Moreover, the first magnetic element 186b corresponds to the second magnetic elements 274a, and the second magnetic pole of the first magnetic element 186b faces the second magnetic pole of the second magnetic elements 274a. Therefore, a magnetic repulsion force is generated between the first magnetic element 186b and the second magnetic elements 274a.

Accordingly, the locking portion 1832 is separated from the second locking element 273 by moving the first locking element 183 to a separation position, and thus a magnetic repulsion force is generated between the first magnetic element 186 and the second magnetic element 274. By the magnetic repulsion force between the first magnetic elements 186 and the second magnetic elements 274, the display device 20 can be moved in the separation direction D3, and then separated from the measurement device 10.

Figure 11:
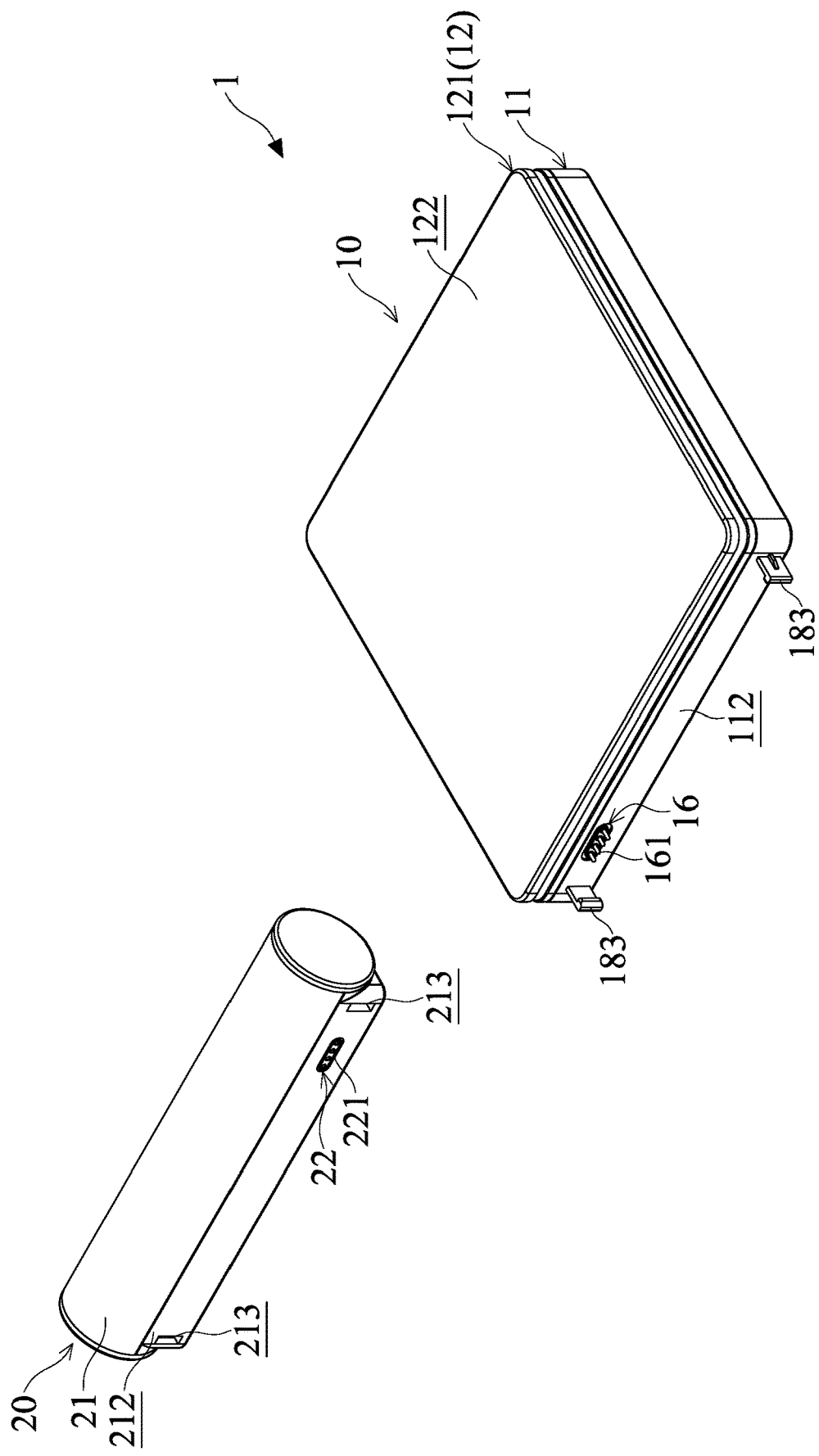
FIG. 11 is a perspective view of the electronic measurement apparatus in accordance with a fifth embodiment of the disclosure, wherein the electronic measurement apparatus is in a separation state.
Figure 12:
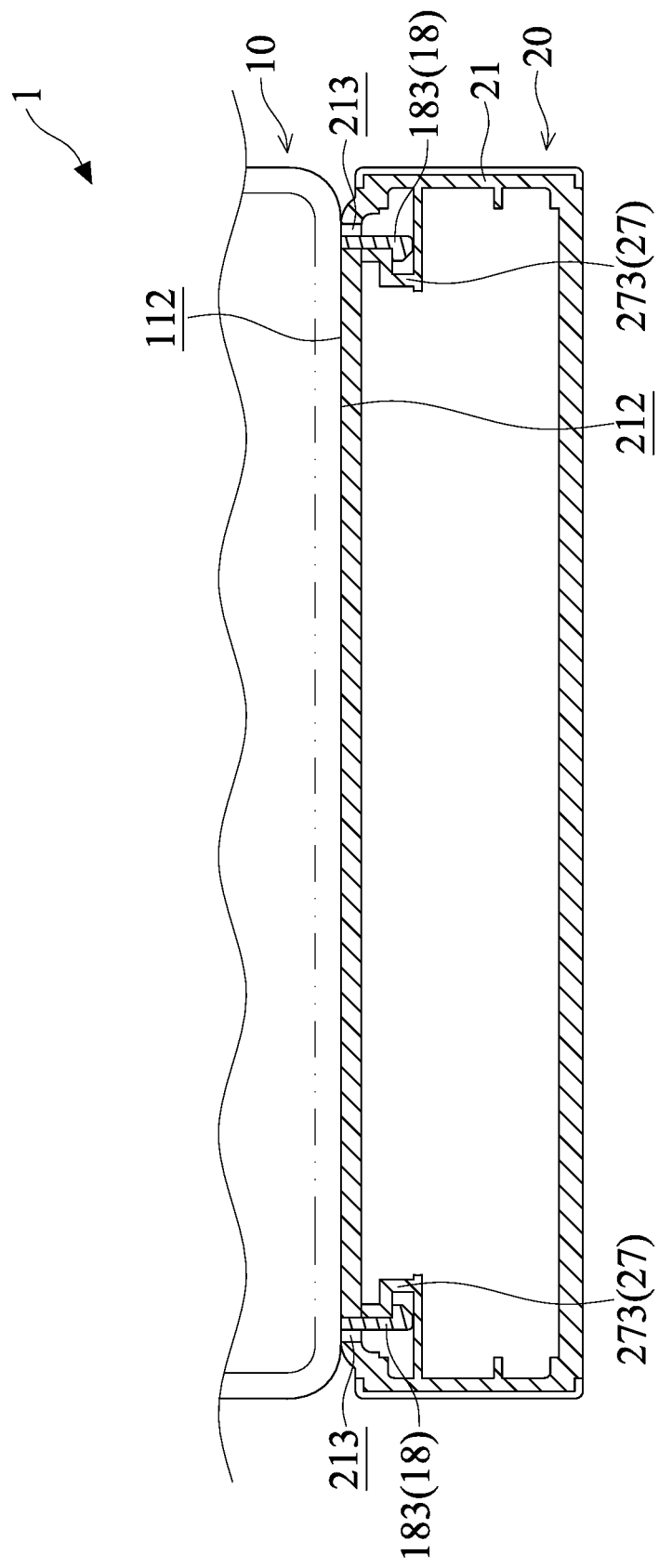
FIG. 12 is a schematic view of the electronic measurement apparatus in accordance with the fifth embodiment of the disclosure, wherein the electronic measurement apparatus is in a combination state.

FIG. 11 is a perspective view of the electronic measurement apparatus 1 in accordance with the fifth embodiment of the disclosure, wherein the electronic measurement apparatus 1 is in a separation state. FIG. 12 is a schematic view of the electronic measurement apparatus 1 in accordance with the fifth embodiment of the disclosure, wherein the electronic measurement apparatus 1 is in a combination state.

In this embodiment, the first connection mechanism 18 includes a first locking element 183 connected to the front surface 112 of the first housing 11. The second housing 21 includes a locking groove 213. The second connection mechanism 27 includes a second locking element 273 connected to the second housing 21 and adjacent to the locking groove 213. When the display device 20 is attached to the measurement device 10, the first locking element 183 is inserted into the locking groove 213, and fastened to the second locking element 273. When the display device 20 is to be separated from the measurement device 10, the user can move the display device 20 and the measurement device 10 in opposite directions to remove the first locking element 183 from the second locking element 273.

The disclosed features may be combined, modified, or replaced in any suitable manner in one or more disclosed embodiments, but are not limited to any particular embodiments.

In conclusion, the measurement device of embodiments in the present disclosure can transmit the measurement result to the display device by wireless transmission, and the display device is detachably assembled with the measurement device. Therefore, the user can place the display device in an easy-to-view location to provide user convenience. Moreover, the display device can be simply assembled with the measurement device via the connection mechanism. The user can easily and quickly separate the display device from the measurement device, or assemble the display device with the measurement device.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic measurement apparatus, comprising:
a measurement device, comprising:
a first housing;
a measurement module disposed on the first housing, and configured to generate a measurement signal; and
a first wireless module disposed in the first housing, and configured to generate a wireless signal according to the measurement signal; and
a display device detachably assembled with the measurement device, and comprising:
a second housing;
a second wireless module disposed in the second housing, and configured to receive the wireless signal; and
a display panel disposed on the second housing, and configured to display measurement data, which is corresponding to the measurement signal, according to the wireless signal;
wherein the measurement device further comprises a first connection mechanism disposed on the first housing, and the display device further comprises a second connection mechanism disposed on the second housing and corresponding to the first connection mechanism, wherein the display device is detachably assembled with the measurement device by fastening the second connection mechanism with the first connection mechanism;
wherein the first connection mechanism comprises:
a first locking element movably disposed on the first housing; and
an elastic component disposed in the first housing, and configured to apply an elastic force to the first locking element;
wherein the second housing further comprises a locking groove, and the second connection mechanism comprises a second locking element connected to the second housing and adjacent to the locking groove, wherein when the display device is attached to the measurement device, the first locking element is inserted into the locking groove and fastened to the second locking element.

2. The electronic measurement apparatus as claimed in claim 1, wherein the first connection mechanism comprises a first magnetic element connected to the first housing, and the second connection mechanism comprises a second magnetic element connected to the second housing, wherein when the display device is attached to the measurement device, the first magnetic element is adjacent to the second magnetic element, and a magnetic attraction force is generated between the first magnetic element and the second magnetic element.

3. The electronic measurement apparatus as claimed in claim 1, wherein the first connection mechanism comprises a first sliding track connected to the first housing, and the second connection mechanism comprises a second sliding track connected to the second housing, wherein when the display device is attached to the measurement device, the first sliding track is assembled with the second sliding track, and the first sliding track limits the movement of the display device relative to the measurement device in a movement direction.

4. The electronic measurement apparatus as claimed in claim 1, wherein the first connection mechanism further comprises a release button movably disposed on the first housing and connected to the first locking element, and when the display device is attached to the measurement device, the first locking element is separated from the second locking element by pressing the release button.

5. The electronic measurement apparatus as claimed in claim 1, wherein the first connection mechanism further comprises a plurality of first magnetic elements, arranged on the first locking element, and the second connection mechanism further comprises a plurality of second magnetic elements arranged on the second housing,
wherein when the display device is attached to the measurement device, and the first locking element is located in an initial position, a magnetic attraction force is generated between the first magnetic elements generate and the second magnetic elements, and when the display device is attached to the measurement device, and the first locking element is located in a separation position, a magnetic repulsion force between the first magnetic elements generates and the second magnetic elements.

6. The electronic measurement apparatus as claimed in claim 1, wherein the first housing comprises a positioning protrusion, and the second housing comprises a positioning groove, wherein when the display device is attached to the measurement device, the positioning protrusion is located in the positioning groove.

7. The electronic measurement apparatus as claimed in claim 1, wherein the measurement device further comprises a first electrical terminal movably disposed on the first housing, and the display device further comprises a second electrical terminal disposed on the second housing, wherein when the display device is attached to the measurement device, the first electrical terminal is connected to the second electrical terminal.

8. The electronic measurement apparatus as claimed in claim 7, wherein the measurement device further comprises a first battery disposed in the first housing and electrically connected to the first electrical terminal, and the display device further comprises a second battery disposed in the second housing and electrically connected to the second electrical terminal.

9. The electronic measurement apparatus as claimed in claim 1, wherein the measurement device further comprises a weight sensor configured to generate a weight signal, and the measurement signal comprises the weight signal.

10. The electronic measurement apparatus as claimed in claim 1, wherein the measurement device further comprises a temperature sensor configured to generate a temperature signal, and the measurement signal comprises the temperature signal.

11. An electronic measurement apparatus, comprising:
a measurement device, comprising:
a first housing;
a measurement module disposed on the first housing, and configured to generate a measurement signal; and
a first wireless module disposed in the first housing, and configured to generate a wireless signal according to the measurement signal; and
a display device detachably assembled with the measurement device, and comprising:
a second housing;
a second wireless module disposed in the second housing, and configured to receive the wireless signal; and a display panel disposed on the second housing, and configured to display measurement data, which is corresponding to the measurement signal, according to the wireless signal;

wherein the measurement device further comprises a first electrical terminal movably disposed on the first housing, and the display device further comprises a second electrical terminal disposed on the second housing, wherein when the display device is attached to the measurement device, the first electrical terminal is connected to the second electrical terminal.

12. The electronic measurement apparatus as claimed in claim 11, wherein the measurement device further comprises a first battery disposed in the first housing and electrically connected to the first electrical terminal, and the display device further comprises a second battery disposed in the second housing and electrically connected to the second electrical terminal.

* * * * *